Sept. 2, 1924.
G. A. KEEP ET AL
1,507,120
PROCESS OF HEATING AND DISTILLING LIQUIDS AND APPARATUS THEREFOR
Filed May 29, 1922
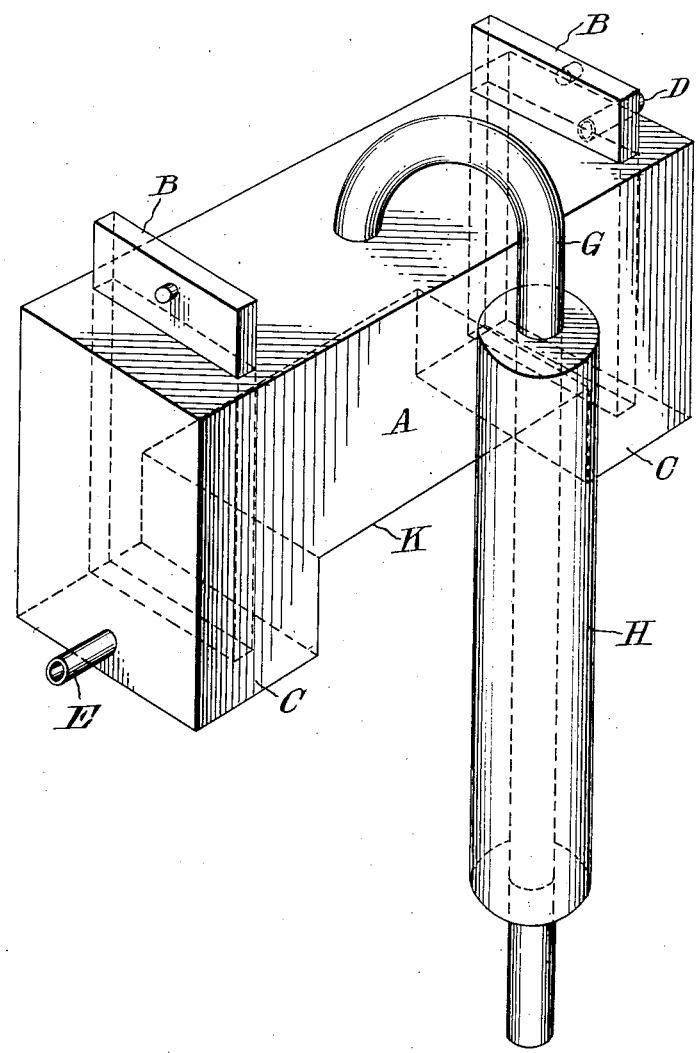

Patented Sept. 2, 1924.

1,507,120

UNITED STATES PATENT OFFICE.

GLENN A. KEEP, OF ELIZABETH, NEW JERSEY, AND CLAYTON M. HOFF, OF CLEVELAND, OHIO, ASSIGNORS TO THE GRASSELLI CHEMICAL COMPANY, OF CLEVELAND, OHIO, A CORPORATION OF OHIO.

PROCESS OF HEATING AND DISTILLING LIQUIDS AND APPARATUS THEREFOR.

Application filed May 29, 1922. Serial No. 564,512.

*To all whom it may concern:*

Be it known that we, (1) GLENN A. KEEP and (2) CLAYTON M. HOFF, citizens of the United States, residing at (1) Elizabeth, (2) Cleveland, in the counties of (1) Union, (2) Cuyahoga, and States of (1) New Jersey, (2) Ohio, have invented certain new and useful Improvements in Processes of Heating and Distilling Liquids and Apparatus Therefor, of which the following is a specification.

This invention relates to a process and apparatus for heating and distilling liquids by means of heat generated by the passage of electric current through the liquids.

A feature of the invention resides in the heating of a liquid to distillation temperature by means of electric current passing through the liquid without substantial electrolysis or decomposition of the liquid.

The invention is of general application. It may be applied for the heating or distillation of any liquid which is a conductor of electricity but is particularly advantageous in the distillation and the simultaneous concentration and purification of crude acid solutions such as solutions of sulfuric acid, nitric acid, hydrochloric acid, and the like, The mode of operation and the advantages of the invention are illustrated in the following detailed description of the continuous distillation, concentration and purification of crude hydrochloric acid solutions. It is to be understood however that the invention is not limited to the distillation of hydrochloric acid excepting as is required by the appended claims.

We have found that by the use of our invention chemically pure concentrated hydrochloric acid solutions of say 35 to 38 or 39 per cent acid, can be continuously produced from crude hydrochloric acid solutions in a single continuous distilling operation.

In the manufacture of concentrated and more or less purified hydrochloric acid solutions it is customary to distill crude concentrated acid in glass retorts heated on a sand bath and to condense or absorb the first distillate, which may be regarded as pure hydrochloric acid gas, in a relatively dilute hydrochloric acid solution such as, the constant boiling solution obtained in a previous distillation, whereby a concentrated solution containing as high as 38 or 39 per cent of HCl is obtained. After the free hydrochloric acid has been distilled from a batch of crude acid the distillation is continued whereby pure dilute acid or constant boiling acid for use as the absorbing medium in a subsequent operation is produced.

This process is essentially batch operation, requiring for plant operation on a commercial scale a large number of independent, easily breakable units of apparatus, the operation and maintenance of which is expensive. In order to produce concentrated acid containing from 35 to 38 per cent of HCl two or more distillations and absorptions with intermediate cooling of the absorbing liquid are necessary.

In the manufacture of chemically pure concentrated hydrochloric solution acid from crude acid solution according to our invention the crude acid is supplied continuously to the distilling vessel and residual acid carrying the excess of water and impurities is continuously withdrawn from the distilling vessel, pure concentrated distillate being continuously produced. The addition of crude acid and withdrawal of residual acid need not be strictly continuous but may be intermittent. The rate of feed of crude acid and the rate of withdrawal of residual acid or both may be varied as required depending upon the rate of heating or distillation and the concentration of the distillate desired.

In the accompanying drawing we have illustrated apparatus suitable for carrying out the process.

The apparatus comprises a retort A made of earthenware, porcelain or other refractory non-conductive material. The opposite ends of the retort are deeper than the central portion, the deep end portions forming electrode wells C, C and the bottom of the intermediate shallow portion forming a bridge K between the wells. Graphite electrodes, B, B are positioned in the electrode wells C, C. The condenser tube G leads from the top of the retort through a cooling jacket H to a receptacle or storage vessel which is not shown, for the acid. In the drawing we have illustrated only a single condenser tube G but it will be apparent that a plurality of such condenser tubes may be connected to each retort unit, preferably to a manifold. The number of condenser tubes attached to each retort unit depends upon the size and capacity of the unit and the size of the condenser tubes used.

The retort unit is provided with a crude acid inlet D and a residual acid outlet E controlled by means of suitable valves which are not shown.

The concentration of hydrochloric acid as it is carried out in the above described apparatus is as follows:

Crude acid is supplied to the retort through the feed pipe D entering the electrode well C at the right of the figure and flows across the bridge K into the well C at the left of the figure from which residual acid is withdrawn through outlet pipe E. The distillate passes off through the condenser tube G and is condensed and collected.

The heating of the acid is accomplished by passing a low voltage alternating electric current through the acid in the retort between electrodes B, B. Current at voltages of 25, 50, 110 and 220 have been employed with satisfactory results. The rate of heating is regulated either by varying the voltage of the heating current or by varying the depth of acid over the bridge K or both.

The rate of feed of crude acid to the retort and the rate of withdrawal of residual acid from the retort will depend upon the concentration of the crude acid, the rate of distillation, and the concentration of the distillate. For instance, if acid containing 39 per cent HCl is to be produced from crude acid containing 32 per cent of HCl, 100 pounds of the crude acid is fed while 37 pounds of constant boiling residual acid containing about 20 per cent of HCl are withdrawn and 63 pounds of 39 per cent acid are recovered as distillate. If stronger or weaker crude acid is used at the start or a different concentration of distillate is desired the relative rates of feed of crude acid and withdrawal of residual acid must be varied accordingly.

Instead of collecting separate condensates of pure concentrated acid and constant boiling acid and discarding the residual acid carrying the bulk of the impurities, as in the usual process of making concentrated hydrochloric acid solutions referred to above, we continuously produce a distillate of acid of the desired concentration which may be substantially the maximum and continuously withdraw from the distilling vessel residual acid carrying the impurities of the crude acid as well as the water in the crude acid in excess of that required to form a distillate of the desired concentration. The production of a purified distillate of constant boiling acid to be used for absorbing hydrochloric acid gas in order to form a solution of the desired concentration is thus avoided.

An important feature of our invention is the distillation of liquids without substantial electrolysis or decomposition of the liquid. This is accomplished by providing a relatively large area for the introduction of electric current into the solution as compared with the minimum cross sectional area of the body of solution traversed by the current. If this is not done considerable electrolysis of the solution will occur resulting in the generation of hydrogen and chlorine in case hydrochloric acid solution is being distilled.

In our apparatus we have provided a relatively large area for the introduction of current into the liquid as compared with the cross sectional area of the liquid to be heated by providing electrode wells of greater depth than the depth of the distilling vessel over the bridge wall. We prefer this form of apparatus because of its simplicity. The relative area of the electrodes exposed to the liquid and of the cross sectional area of the liquid or the bridge wall is readily varied by increasing or decreasing the depth of liquid in the distilling vessel. The bulk of the heating and distillation occurs in the region over the bridge wall, that is, at the point where the current density and consequently the heating effect are greatest.

We claim:

1. Process of heating liquid which comprises passing an alternating electric current through a body of liquid between electrodes, the minimum cross sectional area of the liquid in the path of the electric current being substantially less than the area of the electrodes in contact with the liquid.

2. Process of heating liquid by the passage of an alternating electric current through the liquid which comprises, introducing current into the liquid at a current density sufficiently low to substantially avoid electrolysis of the liquid, and increasing the current density in the liquid in a region intermediate and spaced from said electrodes to obtain the desired heating effect.

3. Process of distilling liquid which is a conductor of electricity which comprises, providing a flowing stream of said liquid and passing an alternating electric current between electrodes in contact with said liquid through a region the cross sectional area of which is substantially less than the area of said electrodes in contact with said liquid.

4. Process of distilling hydrochloric acid solutions which comprises, passing an alternating electric current through a body of a hydrochloric acid solution whereby it is heated and distilled and supplying acid solution to be distilled to said body and withdrawing residual acid solution from said body while the distillation is taking place.

5. Process of distilling hydrochloric acid solution which comprises, maintaining a flowing stream of hydrochloric acid solution, and passing an alternating electric current through the stream of solution to heat and distill the same.

6. Process of distilling hydrochloric acid solution which comprises, maintaining a body of hydrochloric acid solution to be distilled, passing an alternating electric current through said body to heat and distill the same, supplying hydrochloric acid solution to said body at one point, and removing hydrochloric acid solution from said body at a point remote from said point of supply.

7. Process of distilling hydrochloric acid solution which comprises, establishing a flowing stream of hydrochloric acid solution of predetermined cross sectional area, subjecting said stream of acid solution to the action of an alternating electric current at a predetermined potential difference between two points in said stream to heat and distill said acid solution, and controlling the concentration of the distillate by regulating the rate of flow of said stream between said points.

8. Process of making chemically pure concentrated hydrochloric acid solution in a single operation which comprises, supplying concentrated crude hydrochloric acid solution to a distilling apparatus, heating and distilling said solution by passing an alternating electric current through the same, condensing the distillate, and removing residual hydrochloric acid solution of a concentration less than the concentration of the crude acid from said distilling apparatus during the distilling operation.

9. Process of distilling hydrochloric acid solution which comprises providing a flowing body of said solution, passing an alternating electric current through said body between electrodes having sufficient area in contact with the liquid to substantially avoid electrolysis of the liquid, and maintaining the cross sectional area of a portion of said body of liquid intermediate said electrodes less than the area of contact between either of said electrodes with said liquid.

10. Apparatus for heating liquid comprising a receptacle, electrodes positioned in spaced relation in said receptacle, a portion of said receptacle intermediate said electrodes being of less cross sectional area than the area of said electrodes, and means for supplying liquid to and withdrawing liquid from said receptacle.

11. Apparatus for heating liquid comprising a receptacle having an intermediate portion of less cross sectional area than the end portions of said receptacle, and electrodes positioned in said end portion of said receptacle each having a greater area than said intermediate portion of said receptacle.

12. Apparatus for distilling liquid comprising a closed receptacle, means for supplying liquid at one end of said receptacle, means for withdrawing liquid from the other end of said receptacle, a condenser for receiving distillate from receptacle, said receptacle having deep end portions and a relatively shallow intermediate portion, and electrodes positioned in said deep end portions of said receptacle.

13. Apparatus for distilling hydrochloric acid solutions comprising a retort, electrodes positioned in said retort, a source of an alternating electric current connected with said electrodes, means for supplying hydrochloric acid solution at one point in said retort, means for withdrawing hydrochloric acid solution from another point in said retort, and means for condensing distillate from said retort.

14. Apparatus for distilling hydrochloric acid solutions comprising a retort, said retort comprising electrode wells separated by a bridge wall, electrodes in said wells, means for supplying hydrochloric acid solution to one of said wells, and means for withdrawing hydrochloric acid solution from another of said wells.

15. Apparatus for distilling hydrochloric acid solutions comprising a refractory retort, electrode wells at opposite ends of said retort, a bridge wall between said wells, electrodes in said wells, means for flowing hydrochloric acid solution into one of said wells over said bridge wall and out of the other of said wells, and means for condensing the distillate from said retort.

In testimony whereof, we affix our signatures.

GLENN A. KEEP.
CLAYTON M. HOFF.